United States Patent
Okuda

(10) Patent No.: US 9,884,395 B2
(45) Date of Patent: Feb. 6, 2018

(54) MACHINE TOOL PROVIDED WITH CLAMPING JIG FOR ROTATIONALLY-SYMMETRICAL BODY

(71) Applicant: FANUC Corporation, Yamanashi (JP)

(72) Inventor: Shinji Okuda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/744,167

(22) Filed: Jun. 19, 2015

(65) Prior Publication Data

US 2015/0367468 A1 Dec. 24, 2015

(30) Foreign Application Priority Data

Jun. 20, 2014 (JP) ................................. 2014-127076

(51) Int. Cl.
*B23Q 3/06* (2006.01)
*B23Q 3/18* (2006.01)
*B23Q 3/00* (2006.01)

(52) U.S. Cl.
CPC ............. *B23Q 3/183* (2013.01); *B23Q 3/002* (2013.01); *B23Q 3/062* (2013.01); *B23Q 3/069* (2013.01)

(58) Field of Classification Search
CPC .......... B23Q 3/002; B23Q 3/06; B23Q 3/069; B23Q 3/18–3/186; B24B 5/045; B24B 5/047; B24B 5/04
USPC ................................................ 451/397–398
See application file for complete search history.

(56) References Cited

U.S. PATENT DOCUMENTS

| | | | | |
|---|---|---|---|---|
| 2,885,915 A | * | 5/1959 | Schurger | B23Q 1/38 269/20 |
| 2,909,966 A | * | 10/1959 | Barens | B23C 3/18 409/117 |
| 3,103,143 A | * | 9/1963 | Perger | B23F 5/22 269/50 |
| 3,393,474 A | * | 7/1968 | Buswell | B24B 37/042 451/271 |
| 3,564,706 A | * | 2/1971 | Klingel | B23C 3/12 29/558 |
| 3,746,523 A | * | 7/1973 | Johansson | B24B 41/061 451/397 |
| 5,177,854 A | * | 1/1993 | Herbert, Jr. | B23Q 3/086 29/407.08 |

(Continued)

FOREIGN PATENT DOCUMENTS

| | | |
|---|---|---|
| JP | 1-210240 A | 8/1989 |
| JP | 2002-263767 A | 9/2002 |

(Continued)

OTHER PUBLICATIONS

Office Action dated Sep. 8, 2015, corresponding to Japanese Patent Application No. 2014-127076.

*Primary Examiner* — Larry E Waggle, Jr.
*Assistant Examiner* — Tyrone V Hall, Jr.
(74) *Attorney, Agent, or Firm* — Hauptman Ham, LLP

(57) ABSTRACT

Provided is a machine tool which performs a cutting work on a workpiece, in which holes are provided at three or more points in a circumferential direction of a jig in the vicinity of a point at which the jig comes into contact with the workpiece when the workpiece is placed on the jig, and the workpiece is moved toward a rotation center of the jig by blowing air from an air supply unit toward the workpiece through the holes.

4 Claims, 5 Drawing Sheets

(56) References Cited

U.S. PATENT DOCUMENTS

| | | | | |
|---|---|---|---|---|
| 5,239,892 A * | 8/1993 | Sakai | ............... | B23Q 1/28 |
| | | | | 108/139 |
| 5,531,633 A * | 7/1996 | Riley | ............... | B23B 23/02 |
| | | | | 29/889.23 |
| 2005/0023778 A1 * | 2/2005 | Louthan | ............... | B23B 31/202 |
| | | | | 279/156 |
| 2005/0249565 A1 * | 11/2005 | Mueller | ............... | F04D 29/284 |
| | | | | 409/132 |
| 2011/0067240 A1 * | 3/2011 | Prust | ............... | B23B 3/12 |
| | | | | 29/889.23 |

FOREIGN PATENT DOCUMENTS

| | | |
|---|---|---|
| JP | 2005-538854 A | 12/2005 |
| JP | 2010-234516 A | 10/2010 |
| JP | 2011-16206 A | 1/2011 |
| JP | 2011-513077 A | 4/2011 |

* cited by examiner

MACHINE TOOL PROVIDED WITH CLAMPING JIG FOR ROTATIONALLY-SYMMETRICAL BODY

RELATED APPLICATIONS

The present application claims priority to Japanese Application Number 2014-127076, filed Jun. 20, 2014, the disclosure of which is hereby incorporated by reference herein in its entirety.

BACKGROUND OF THE INVENTION

1. Field of the Invention

The present invention relates to a machine tool provided with a clamping jig for a rotationally-symmetrical body, and particularly to a machine tool provided with a jig which clamps a workpiece when the workpiece of a rotationally-symmetrical body such as an impeller used in a compressor or the like is subjected to a cutting work.

2. Description of the Related Art

Recently, an impeller used in a vehicle, an air conditioner, or the like is increasingly formed by a cutting work. In the cutting work of the impeller, particularly in a rough machining stage before a finishing machining, a cutter having a large diameter is used or the cutting speed is increased in order to efficiently perform the cutting work and reduce the machining time, in many cases. In addition, in order to use the cutter having a large diameter or increase the cutting speed, as a method of bearing a high cutting load, an impeller workpiece needs to be fixed to a cutting jig. In addition, for good rotational balance of a product after being subjected to the cutting work, the cutting work needs to be performed without eccentricity of a workpiece.

JP 2011-513077 W discloses a machine tool for cutting a workpiece having a center hole, which includes a workpiece support table on which the workpiece is placed, a workpiece holding portion having a gripping arm which presses the workpiece from above, and a driving unit which rotates the workpiece around the center axis line thereof, wherein the workpiece support table has a protrusion which is fitted into the center hole of the workpiece from below, a tip end of the gripping arm has a protrusion which is fitted into the center hole of the workpiece from above, and the protrusion presses the workpiece downward.

However, in the apparatus disclosed in JP 2011-513077 W, a mechanism for bringing the protrusions into contact with the hole is provided, and the angle of the end surface of the hole and the inclined surface of the protrusion have line contact therebetween. Therefore, there is concern that non-contact may occur depending on the precision of the shapes of the hole and the protrusions.

JP 2005-538854 W discloses an apparatus including a tie rod and a support element to clamp a rotationally-symmetrical body for machining, in which a spring force in a direction opposite to a tensile force is applied to the support element, the support element is configured to be bent in an axial direction when the rotationally-symmetrical body abuts the support element because the spring force is weaker than the tensile force, and the support element is elastically supported by a stop of the apparatus and is allowed to move in an axial direction of the clamped rotationally-symmetrical body.

However, in the apparatus disclosed in JP 2005-538854 W, a mechanism for bringing the support element having a centering action into contact with the workpiece is used, and the support element is movable in the axial direction.

In the technique disclosed in any of JP 2011-513077 W and JP 2005-538854 W described above, when a workpiece is fixed to a jig, a mechanism for centering the workpiece on the jig is not present, and thus the workpiece is not centered and is clamped with eccentricity. Therefore, when a cutting work is performed thereon, there is concern that the rotational balance of a product after the cutting work may be degraded.

SUMMARY OF THE INVENTION

The invention provides a machine tool in which a workpiece can be mounted on a jig without eccentricity and the rotational balance of a product after a cutting work is improved.

According to a first aspect of the invention, a machine tool includes: a jig capable of fixing a workpiece to perform a cutting work on the workpiece; a rotating table capable of rotating the workpiece; and an air supply unit capable of supplying air, in which the jig includes at least three holes on a circumference in the vicinity of a point at which the jig comes into contact with the workpiece when the workpiece is fixed, and the air supply unit is capable of supplying the air through the holes.

The jig may include an inclined surface which is depressed toward a rotation center from an outer edge portion of the jig, and the holes may be provided in the inclined surface.

The jig may include a protrusion capable of being fitted into a center hole of the workpiece, and the holes may be provided in the protrusion of the jig.

The jig may include a drawing bar which penetrates through a center hole of the workpiece and allows the workpiece to be drawn in a direction of the jig, and the holes may be provided in the drawing bar.

The jig may include a jig center hole portion and a drawing bar which is substantially concentrically connected to the center hole of the workpiece, and the holes may be provided in the drawing bar.

The jig may include a jig center hole portion into which a protrusion of the workpiece having the protrusion is capable of being inserted, and the holes may be provided in the jig center hole portion.

The machine tool may further include a pressure adjusting unit capable of controlling a pressure of the air which is discharged from each of the holes and is blown toward the workpiece placed on the jig.

According to a second aspect of the invention, a machine tool includes: a jig capable of fixing a workpiece to perform a cutting work on the workpiece; an arm which presses the workpiece against the jig; a rotating table capable of rotating the workpiece; and an air supply unit capable of supplying air, in which the arm includes holes at three or more points on a circumference in the vicinity of a point at which the arm comes into contact with the workpiece when the workpiece is fixed to the jig, and the air supply unit is capable of supplying the air through the holes.

The arm may include an arm protrusion capable of being inserted into a center hole of the workpiece, and the holes may be provided in the arm protrusion.

The arm may include an arm center hole portion into which a protrusion of the workpiece having the protrusion is capable of being inserted, and the holes may be provided in the arm center hole portion.

The machine tool may further include a pressure adjusting unit capable of controlling a pressure of the air which is discharged from each of the holes and is blown toward the workpiece placed on the jig.

According to the invention, it is possible to provide a machine tool in which a workpiece can be mounted on a jig without eccentricity and the rotational balance of a product after a cutting work is improved.

BRIEF DESCRIPTION OF THE DRAWINGS

The above and other objects and features of the invention will be more apparent from the following detailed description taken in conjunction with the accompanying drawings in which.

DETAILED DESCRIPTION OF THE PREFERRED EMBODIMENTS

Figure 1:
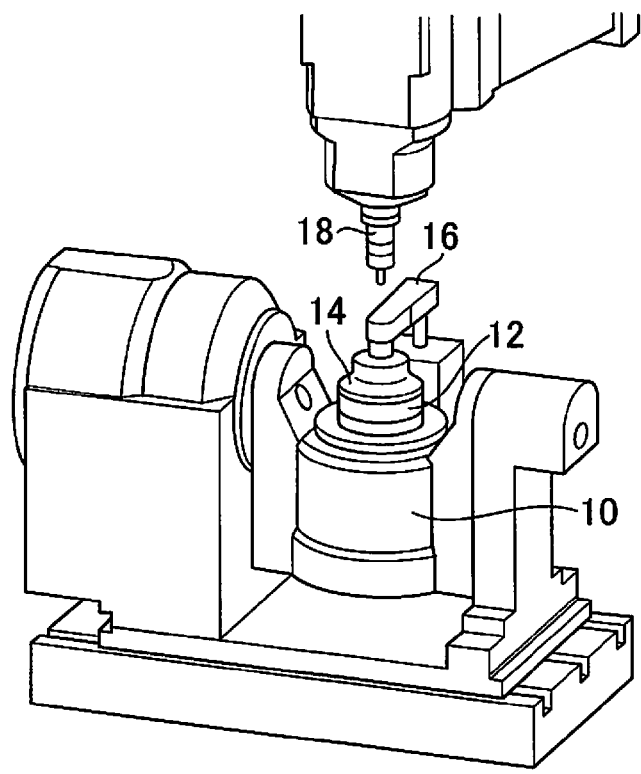
FIG. 1 is a schematic view of a machine tool according to the invention.

A machine tool according to the invention includes a rotating table 10 as illustrated in FIG. 1. A jig 12 is provided on the rotating table 10, and a workpiece 14 having the shape of a rotationally-symmetrical body is fixed onto the jig 12. The workpiece 14 is fixed to the jig 12 by being pressed against the jig 12 by an arm 16 provided above the workpiece 14 (as described later, there may be cases where the workpiece 14 is fixed to the jig 12 without the use of the arm 16 depending on circumstances). The workpiece 14 fixed to the jig 12 is rotated by the rotating table 10 and is machined by a tool 18.

First, a first embodiment of the machine tool according to the invention will be described with reference to FIGS. 2 and 3.

Air supply holes 52 (52a, 52b, and 52c) are provided in the upper surface of the jig 12 is provided with in the vicinity of a location where the jig 12 comes into contact with the workpiece 14 when the workpiece 14 is placed on the jig 12.

Figure 3:
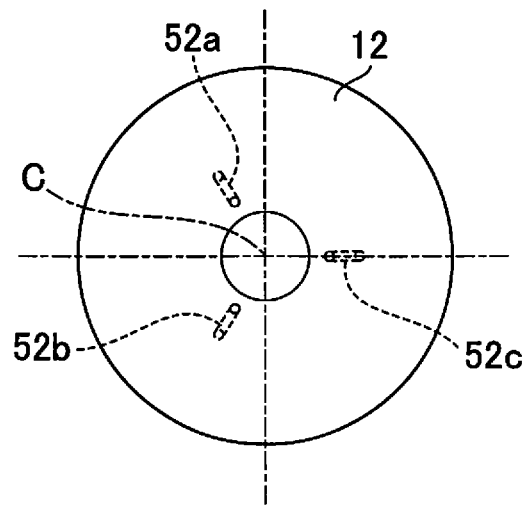
FIG. 3 is a view of the jig of FIG. 2 in a state where the workpiece is removed when viewed from above.

As illustrated in FIG. 3, the air supply holes 52a, 52b, and 52c are provided at three points in the upper surface of the jig 12 at equal distances from the rotation center C and at equal angles (120 degrees therebetween). In addition, the three air supply holes 52a, 52b, and 52c are connected to an air supply unit 100 and are configured such that air supplied from the air supply unit 100 is blown from each of the air supply holes 52a, 52b, and 52c toward the workpiece 14.

It is preferable to align the rotation center of the workpiece with the rotation center C of the jig. However, in an initial stage in which the workpiece 14 is mounted on the jig 12, the rotation center C of the jig 12 and the rotation center of the workpiece 14 are not aligned with each other during the mounting. In this case, in this embodiment, air is blown toward the air supply holes 52a, 52b, and 52c at the three points from the air supply unit 100 at the same degree of pressure.

Figure 2:
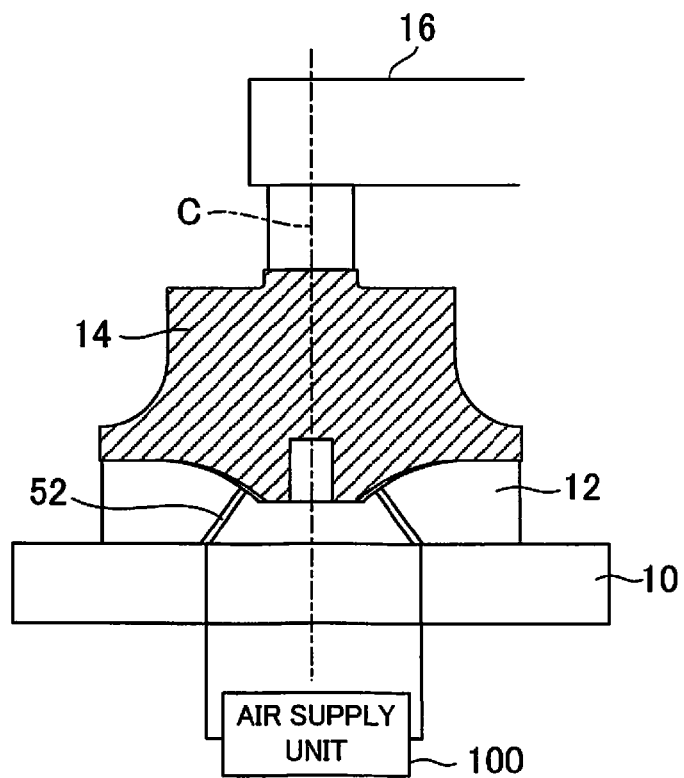
FIG. 2 is a view (side sectional view) illustrating the relationship between a workpiece and a jig in a first embodiment of the machine tool according to the invention.

As an example, in FIG. 2, it is assumed that the workpiece 14 is mounted in a state of being slightly biased toward the left with respect to the rotation center C of the jig 12. In this case, the gap between the workpiece 14 and the jig 12 is narrow on the left side and is wide on the right side. When air is blown from the air supply holes 52 in this state, the pressure in the gap between the jig 12 and the workpiece 14 on the left side with a narrower gap is higher than that on the right side. Therefore, a force to move the workpiece 14 from the left toward the right is exerted. As a result, the workpiece 14 is moved from the left side toward the right side in such a direction in which the rotation center thereof is aligned with the rotation center C of the jig 12. In this manner, the rotation center of the workpiece 14 is centered to be aligned with the rotation center of the jig 12 by blowing air from the air supply holes 52. After the rotation center of the workpiece 14 is aligned with the rotation center of the jig 12, the workpiece 14 is clamped by the jig 12 and may be machined.

In addition, in this embodiment, an example in which the air supply holes 52 are provided at the three points (52a, 52b, and 52c) is used for the description. However, even in a case where the air supply holes 52 are provided at four or more points, the same effect is obtained. In addition, in this embodiment, the air supply holes 52 positioned at the three points are provided with equal intervals therebetween. However, the air supply holes 52 may also be disposed with intervals therebetween which are not equal to each other and the pressure of the air blown from each of the air supply holes 52 is adjusted by a pressure adjusting unit (not illustrated) such that the pressure of the air from the air supply holes 52 which are close to each other is set to be low and the pressure of the air from the air supply holes 52 which are far from each other is set to be high. Accordingly, the rotation center of the workpiece 14 can be centered to be aligned with the rotation center of the jig 12 by blowing the air from the air supply holes 52. The same is applied to the other embodiments as follows.

Figure 4:
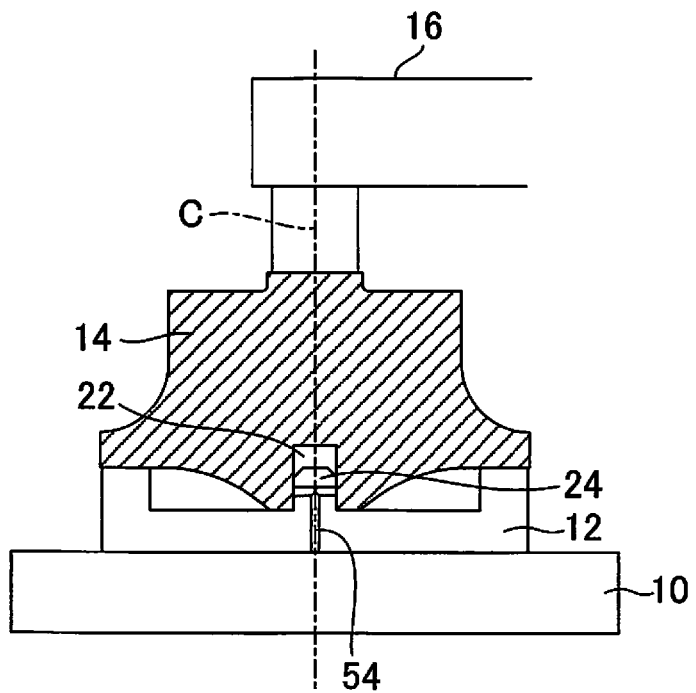
FIG. 4 is a view (side sectional view) illustrating the relationship between a workpiece and a jig in a second embodiment of the machine tool according to the invention.
Figure 5:
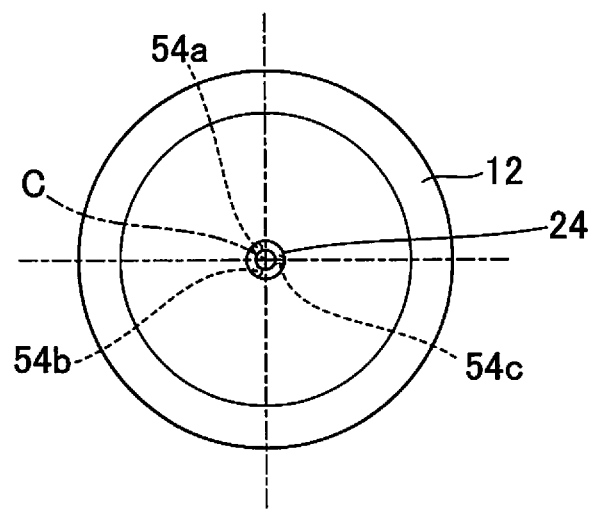
FIG. 5 is a view of the jig of FIG. 4 in a state where the workpiece is removed when viewed from above.

Next, a second embodiment of the machine tool according to the invention will be described with reference to FIGS. 4 and 5.

In this embodiment, the jig 12 has a protrusion 24 in the vicinity of the rotation center C thereof, and the protrusion 24 is configured to be fitted into the center hole 22 provided in the workpiece 14.

In this embodiment, air supply holes 54 are provided in the upper surface of the protrusion 24 of the jig 12 in the vicinity of a location where the protrusion 24 comes into contact with the workpiece 14 when the workpiece 14 is placed on the jig 12. As illustrated in FIG. 5, the air supply holes 54 are provided at three points (air supply holes 54*a*, 54*b*, and 54*c*), and as illustrated in FIG. 5, the air supply holes 54*a*, 54*b*, and 54*c* are provided at the three points in the upper surface of the jig 12 at equal distances from the rotation center C and at equal angles (120 degrees therebetween). In addition, the three air supply holes 54*a*, 54*b*, and 54*c* are connected to an air supply unit (not illustrated) and are configured such that air supplied from the air supply unit is blown from each of the air supply holes 54*a*, 54*b*, and 54*c* toward the workpiece 14. The supply of the air from the air supply unit toward the air supply holes 54 and a mechanism for moving the workpiece 14 toward the direction of the rotation center C of the jig 12 by supplying the air are the same as those of the first embodiment described above.

Figure 6:
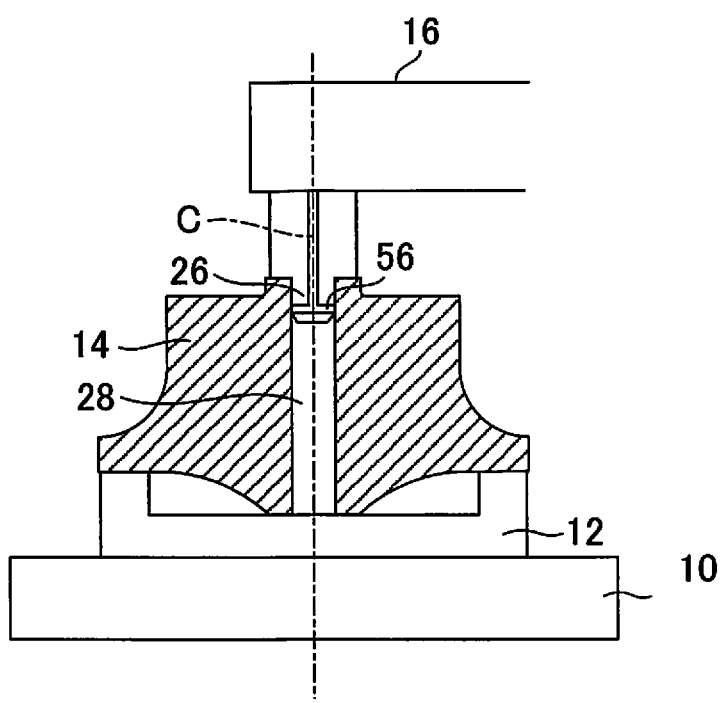
FIG. 6 is a view (side sectional view) illustrating the relationship between a workpiece and a jig in a third embodiment of the machine tool according to the invention.
Figure 7:
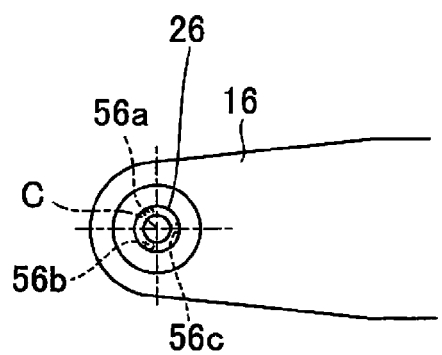
FIG. 7 is a view of an arm and a protrusion of FIG. 6 in a state where the jig and the workpiece are removed when viewed from below.

Next, a third embodiment of the machine tool according to the invention will be described with reference to FIGS. 6 and 7.

In this embodiment, the arm 16 has a protrusion 26 in the vicinity of a site through which the rotation center C of the jig 12 passes, and the protrusion 26 is configured to be fitted into a center hole 28 provided in the workpiece 14.

In this embodiment, air supply holes 56 are provided in the lower surface of the protrusion 26 of the arm 16 in the vicinity of a location where the protrusion 26 comes into contact with the workpiece 14 when the workpiece 14 is placed on the jig 12. As illustrated in FIG. 7, the air supply holes 56 are provided at three points (air supply holes 56*a*, 56*b*, and 56*c*), and as illustrated in FIG. 7, the air supply holes 56*a*, 56*b*, and 56*c* are provided at the three points in the lower surface of the protrusion 26 of the arm 16 at equal distances from the rotation center C and at equal angles (120 degrees therebetween). In addition, the three air supply holes 56*a*, 56*b*, and 56*c* are connected to an air supply unit (not illustrated) and are configured such that air supplied from the air supply unit is blown from each of the air supply holes 56*a*, 56*b*, and 56*c* toward the workpiece 14. The supply of the air from the air supply unit toward the air supply holes 56 and a mechanism for moving the workpiece 14 toward the direction of the rotation center C of the jig 12 by supplying the air are the same as those of the first embodiment described above.

Figure 8:
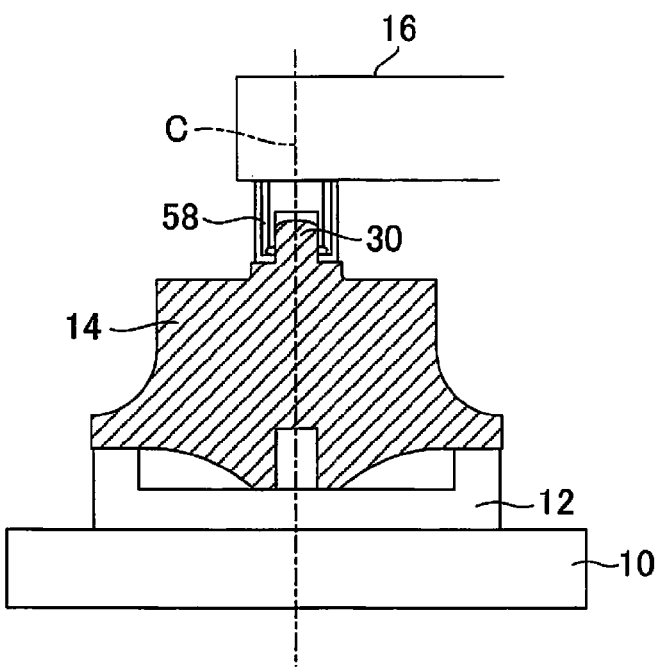
FIG. 8 is a view (side sectional view) illustrating the relationship between a workpiece and a jig in a fourth embodiment of the machine tool according to the invention.

Next, a fourth embodiment of the machine tool according to the invention will be described with reference to FIG. 8.

In this embodiment, the workpiece 14 is provided with a protrusion 30, and the protrusion 30 of the workpiece 14 is configured to be inserted into a center hole provided in the arm 16.

In this embodiment, air supply holes 58 are provided in the lower surface of the arm 16 in the vicinity of a location where the arm 16 comes into contact with the workpiece 14 when the workpiece 14 is placed on the jig 12. The air supply holes 58 are provided at three points, and the air supply holes 58 are provided at the three points in the lower surface of the arm 16 at equal distances from the site through which the rotation center C passes and at equal angles (120 degrees therebetween). In addition, the air supply holes 58 provided at the three points are connected to an air supply unit (not illustrated) such that air supplied from the air supply unit is blown. In addition, the three air supply holes 58 are connected to an air supply unit (not illustrated) and are configured such that the air supplied from the air supply unit is blown from each of the air supply holes 58 toward the workpiece 14. The supply of the air from the air supply unit toward the air supply holes 58 and a mechanism for moving the workpiece 14 toward the direction of the rotation center C of the jig 12 by supplying the air are the same as those of the first embodiment described above.

Figure 9:
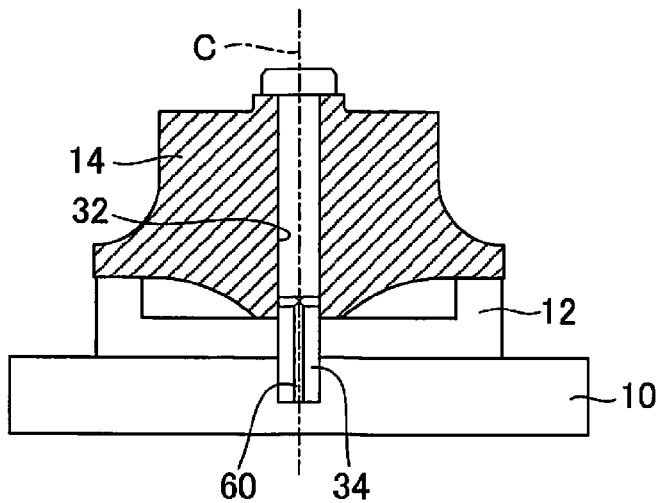
FIG. 9 is a view (side sectional view) illustrating the relationship between a workpiece and a jig in a fifth embodiment of the machine tool according to the invention.

Next, a fifth embodiment of the machine tool according to the invention will be described with reference to FIG. 9.

In this embodiment, a drawing bar 34 is mounted on the jig 12 and is configured such that the drawing bar 34 is fitted into a center hole 32 provided in the workpiece 14 and the workpiece 14 is drawn in the jig 12 via the drawing bar 34 fitted into the workpiece 14.

In this embodiment, three points of the outer periphery of the drawing bar 34 are provided with air supply holes 60 at equal intervals therebetween (120 degrees therebetween). The air supply holes 60 are connected to a conduit having the same axis as the center axis of the drawing bar 34 and to an air supply unit (not illustrated) which is connected to the conduit such that the air supplied from the air supply unit is blown from the air supply holes 60 of the drawing bar 34. The supply of the air from the air supply unit toward the air supply holes 60 and a mechanism for moving the workpiece 14 toward the direction of the rotation center C of the jig 12 by supplying the air are the same as those of the first embodiment described above.

Figure 10:
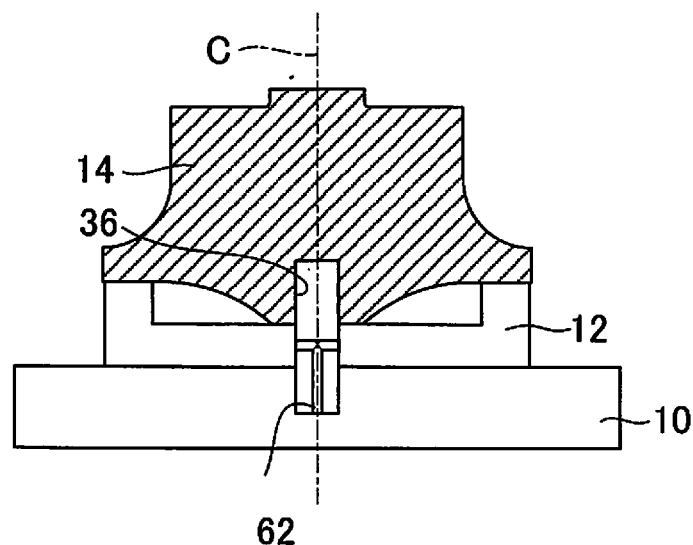
FIG. 10 is a view (side sectional view) illustrating the relationship between a workpiece and a jig in a sixth embodiment of the machine tool according to the invention.

Next, a sixth embodiment of the machine tool according to the invention will be described with reference to FIG. 10.

Even in this embodiment, as in the fifth embodiment described above, the drawing bar 34 is mounted on the jig 12, and the drawing bar 34 is fitted into a center hole 36 provided in the workpiece 14. A difference from the fifth embodiment is that the center hole 36 of the workpiece 14 does not penetrate through the workpiece 14 to the top and is provided to reach an intermediate position of the workpiece 14.

In this embodiment, three points of the outer periphery of the drawing bar 34 are provided with air supply holes 62 at equal intervals therebetween (120 degrees therebetween). The air supply holes 62 are connected to a conduit having the same axis as the center axis of the drawing bar 34 and to an air supply unit (not illustrated) which is connected to the conduit such that the air supplied from the air supply unit is blown from the air supply holes 62 of the drawing bar 34. The supply of the air from the air supply unit toward the air supply holes 62 and a mechanism for moving the workpiece 14 toward the direction of the rotation center C of the jig 12 by supplying the air are the same as those of the first embodiment described above.

Figure 11:
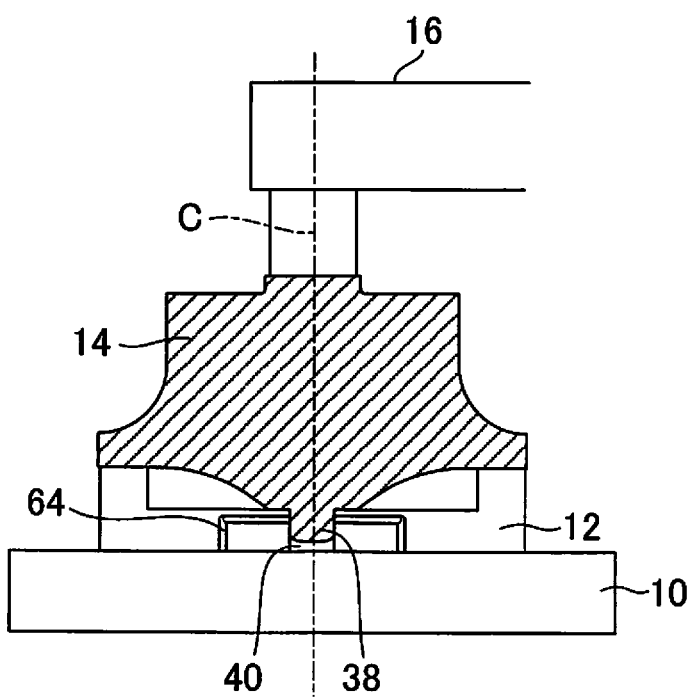
FIG. 11 is a view (side sectional view) illustrating the relationship between a workpiece and a jig in a seventh embodiment of the machine tool according to the invention.

Next, a seventh embodiment of the machine tool according to the invention will be described with reference to FIG. 11.

In this embodiment, the workpiece 14 is provided with a protrusions 38, and the protrusions 38 is configured to be inserted into a jig center hole 40 provided in the jig 12.

In this embodiment, air supply holes 64 are provided in the jig 12 such that the supply holes 64 may be blocked by the protrusion 38 of the workpiece 14 when the protrusion 38 of the workpiece 14 is inserted into the center hole 40 of the jig 12. Three air supply holes 64 are provided on the circumference in the jig center hole 40 about the rotation center C of the jig 12 with equal intervals therebetween (at an angle of 120 degrees therebetween). The three air supply holes 64 are connected to an air supply unit (not illustrated) and are configured such that air supplied from the air supply unit is blown from each of the air supply holes 64 toward the workpiece 14. The supply of the air from the air supply unit toward the air supply holes 64 and a mechanism for moving the workpiece 14 toward the direction of the rotation center C of the jig 12 by supplying the air are the same as those of the first embodiment described above.

In addition, the invention can be appropriately modified to, in addition to the above-described embodiments, a configuration in which air supply holes are provided in the jig 12 and the peripheral members thereof or in the arm 16 and the peripheral members thereof and air is blown from the air supply holes. The number of air supply holes may be four or more, and a plurality of air supply holes may not necessarily be disposed with equal intervals therebetween.

The invention claimed is:

1. A machine tool, comprising:
a jig configured to fix a workpiece to perform a cutting work on the workpiece;
an arm configured to press the workpiece against the jig;
a rotating table configured to rotate the workpiece; and
an air supply unit configured to supply air,
wherein
the arm includes holes at three or more points on a circumference in the vicinity of a point at which the arm comes into contact with the workpiece when the workpiece is fixed to the jig,
the air supply unit is configured to supply the air through the holes,
wherein
the arm includes an arm protrusion configured to be inserted into a center hole of the workpiece wherein the arm protrusion projects into only a part of the center hole of the workpiece,
the holes are provided in the arm protrusion,
the machine tool further comprises a pressure adjusting unit configured to control a pressure of the air which is discharged from each of the holes and is blown toward the workpiece placed on the jig,
the holes are disposed at intervals which are not equal to each other, and
the pressure adjusting unit is configured to control the pressure of the air from the holes which are closer to each other to be lower than the pressure of the air from the holes which are farther from each other.

2. The machine tool according to claim 1, wherein
the arm has a width and a length greater than the width,
the length of the arm is oriented in a radial direction of the rotating table, and
the arm protrusion extends from an end of the arm downwardly, along a rotational axis of the rotating table, toward the jig.

3. A machine tool, comprising:
a jig configured to fix a workpiece to perform a cutting work on the workpiece;
an arm configured to press the workpiece against the jig;
a rotating table configured to rotate the workpiece; and
an air supply unit configured to supply air,
wherein
the arm includes holes at three or more points on a circumference in the vicinity of a point at which the arm comes into contact with the workpiece when the workpiece is fixed to the jig,
the air supply unit is configured to supply the air through the holes,
the arm includes an arm center hole portion into which a protrusion of the workpiece is to be inserted,
the holes are provided in the arm center hole portion,
a pressure adjusting unit configured to control a pressure of the air which is discharged from each of the holes and is blown toward the workpiece placed on the jig,
the holes are disposed at intervals which are not equal to each other, and
the pressure adjusting unit is configured to control the pressure of the air from the holes which are closer to each other to be lower than the pressure of the air from the holes which are farther from each other.

4. A machine tool, comprising:
a jig configured to fix a workpiece to perform a cutting work on the workpiece;
an arm configured to press the workpiece against the jig;
a rotating table configured to rotate the workpiece; and
an air supply unit configured to supply air,
wherein
the arm includes holes at three or more points on a circumference in the vicinity of a point at which the arm comes into contact with the workpiece when the workpiece is fixed to the jig,
the air supply unit is configured to supply the air through the holes,
the arm includes an arm center hole portion into which a protrusion of the workpiece is to be inserted,
the holes are provided in the arm center hole portion,
the arm has a width and a length greater than the width,
the length of the arm is oriented in a radial direction of the rotating table,
the arm protrusion extends from an end of the arm downwardly, along a rotational axis of the rotating table, toward the jig, and
the holes are oriented radially inwardly toward an interior of the arm center hole portion, and are configured to blow the air supplied from the air supply unit radially inwardly toward the protrusion of the workpiece.

* * * * *